US012743529B2

(12) United States Patent
Trabelsi et al.

(10) Patent No.: US 12,743,529 B2
(45) Date of Patent: Sep. 22, 2026

(54) AUTOMATED REVOCATION SYSTEM FOR LEAKED ACCESS CREDENTIALS

(71) Applicant: SAP SE, Walldorf (DE)

(72) Inventors: Slim Trabelsi, Biot (FR); Marco Rosa, Biot (FR)

(73) Assignee: SAP SE, Walldorf (DE)

( * ) Notice: Subject to any disclaimer, the term of this patent is extended or adjusted under 35 U.S.C. 154(b) by 525 days.

(21) Appl. No.: 17/975,290

(22) Filed: Oct. 27, 2022

(65) Prior Publication Data

US 2024/0143797 A1 May 2, 2024

(51) Int. Cl.
*G06F 21/60* (2013.01)

(52) U.S. Cl.
CPC .................................. *G06F 21/604* (2013.01)

(58) Field of Classification Search
CPC ..................................................... G06F 21/604
See application file for complete search history.

(56) References Cited

U.S. PATENT DOCUMENTS 8,621,237 B1 * 12/2013 Bailey ..................... G06F 21/54 713/189
2016/0034693 A1 * 2/2016 Takeuchi .............. G06F 21/604 713/189
2019/0108363 A1 * 4/2019 Caldwell ............... G06F 21/554
2019/0116172 A1 * 4/2019 Caldwell ............... H04L 67/306
2020/0233971 A1 * 7/2020 Sharp-Paul ........... G06F 21/554
2020/0296081 A1 * 9/2020 Ben David ............. H04L 63/08
2021/0240834 A1 * 8/2021 Trabelsi ................... G06N 3/08
2022/0198053 A1 * 6/2022 Madhavan .......... G06F 21/6245
2022/0253533 A1 * 8/2022 Choi ..................... G06F 21/577
2023/0015269 A1 * 1/2023 Mesrsmid ........... G06F 21/6245
2024/0129293 A1 * 4/2024 Fanning ................ H04L 63/083

OTHER PUBLICATIONS

"Automated token revocation for when you accidentally publish a token", [Online]. Retrieved from the Internet: URL: a href="https: blog.npmjs.org post 182015409750 automated-token-revocation-for-when-you", (accessed on Mar. 28, 2025), 2 pgs.
"About secret scanning", Github Secret Scanning [Online]. Retrieved from the Internet: URL: a href="https: docs.github.com en code-security secret-scanning about-secret-scanning", (accessed on Mar. 28, 2025), 4 pgs.

(Continued)

*Primary Examiner* — Shewaye Gelagay
*Assistant Examiner* — Thomas A Carnes
(74) *Attorney, Agent, or Firm* — SCHWEGMAN LUNDBERG & WOESSNER, P.A.

(57) ABSTRACT

Techniques for automatically revoking leaked access credentials are disclosed. In some embodiments, a computer system may receive an indication that a credential for accessing a resource has been leaked, where the credential has been leaked by being included in content that has been published on an online service or has been stored in a shared folder of the online service. The computer system may then determine that the credential is effective in accessing the resource, and, in response to the determining that the credential is effective, trigger a revocation of the credential, the revocation of the credential causing the credential to no longer be effective in accessing the resource.

15 Claims, 6 Drawing Sheets

(56) References Cited

OTHER PUBLICATIONS

Deng, H., “Tracing and Revoking Leaked Credentials: Accountability in Leaking Sensitive Outsourced Data”, Asia CCS’14, Jun. 4-6, 2014, Kyoto, Japan, (2014), 12 pgs.
Rosa, Marco, “A Github scanning tool that identifies hardcoded credentials while filtering the false positive data through machine learning models”, credential-digger [Online]. Retrieved from the Internet: URL: a href=“https: github.com SAP credential-digger”, (accessed on Mar. 28, 2025), 7 pgs.

* cited by examiner

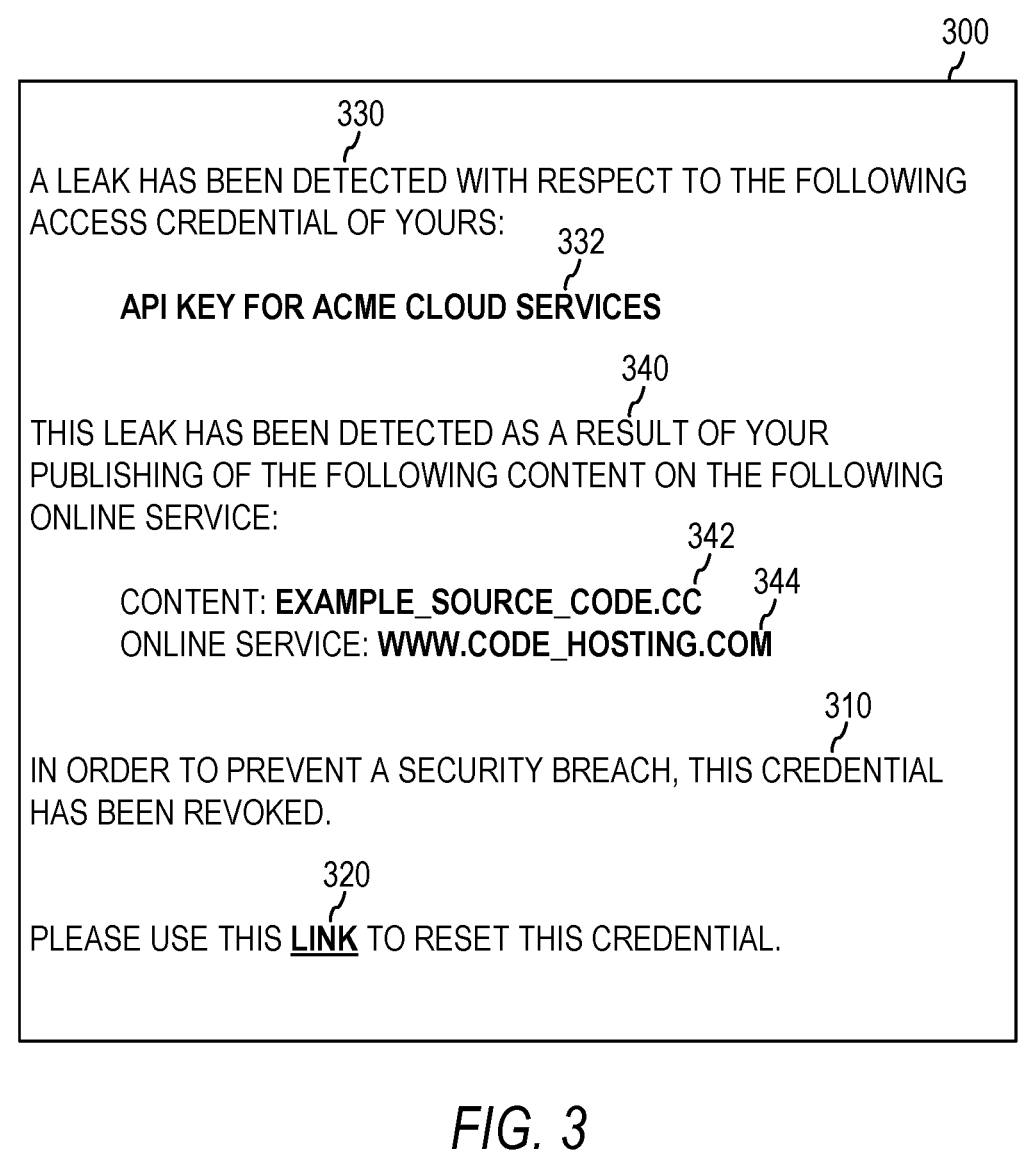

300

330

A LEAK HAS BEEN DETECTED WITH RESPECT TO THE FOLLOWING ACCESS CREDENTIAL OF YOURS:

332

API KEY FOR ACME CLOUD SERVICES

340

THIS LEAK HAS BEEN DETECTED AS A RESULT OF YOUR PUBLISHING OF THE FOLLOWING CONTENT ON THE FOLLOWING ONLINE SERVICE:

342 344

CONTENT: EXAMPLE_SOURCE_CODE.CC
ONLINE SERVICE: WWW.CODE_HOSTING.COM

310

IN ORDER TO PREVENT A SECURITY BREACH, THIS CREDENTIAL HAS BEEN REVOKED.

320

PLEASE USE THIS LINK TO RESET THIS CREDENTIAL.

*FIG. 3*

AUTOMATED REVOCATION SYSTEM FOR LEAKED ACCESS CREDENTIALS

BACKGROUND

Users can make content available for others to access via an online service. For example, software developers may publish source code on a code hosting platform, such as in situations where source code is being used as part of an open-source software project.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates an example notification.

DETAILED DESCRIPTION

Figure 1:
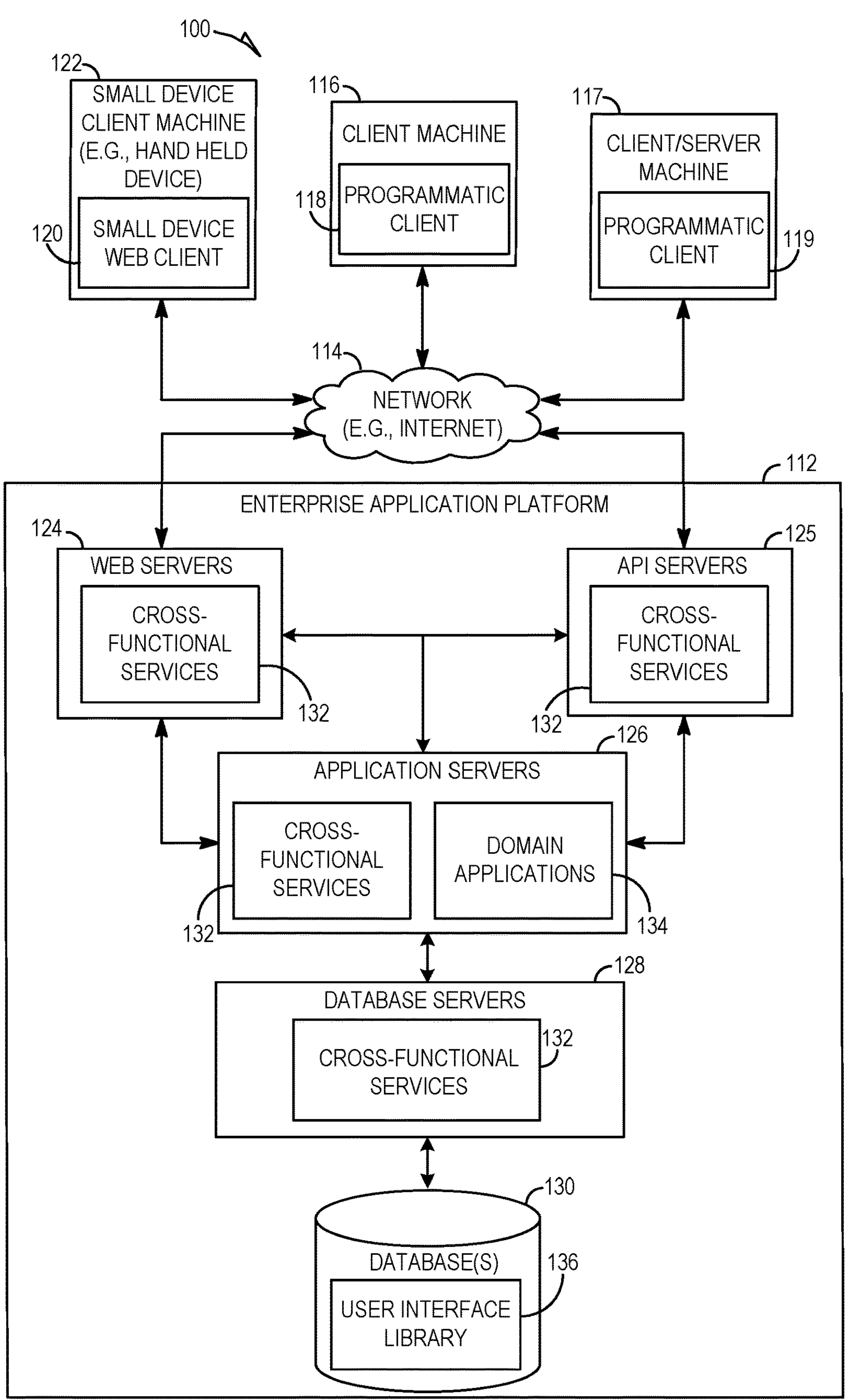
FIG. 1 is an example network diagram illustrating a system.

Example methods and systems of automatically revoking leaked access credentials are disclosed. In the following description, for purposes of explanation, numerous specific details are set forth in order to provide a thorough understanding of example embodiments. It will be evident, however, to one skilled in the art that the present embodiments can be practiced without these specific details.

Users that publish content may not want certain information to be included in their published content. For example, software developers are concerned by the risk of having vulnerabilities that can represent a weakness exploitable by an attacker, which can occur when hardcoded tokens are included in source code that is published. This type of leak may occur when a software developer leaves hard-coded credentials in source code. The credentials can be used for inbound authentication, outbound communication to external components, or encryption of internal data. In these situations, it becomes very easy for an attacker to use these credentials to access a system, a database, or bypass the access control systems protecting the software. As a result, the security of electronic data, software, and hardware may be compromised. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to automatically revoke leaked access credentials. In some example embodiments, a computer system may receive an indication that a credential for accessing a resource has been leaked, determine that the credential is effective in accessing the resource, and, in response to determining that the credential is effective, triggering a revocation of the credential. The credential may have been leaked by being included in content that has been published on an online service or by being included in content that has been stored in a shared folder of the online service. The revocation of the credential may cause the credential to no longer be effective in accessing the resource.

By automatically triggering the revocation of the leaked credential in response to the determination that the leaked credential is still effective in accessing the resource, the computer system quickly removes the vulnerability of the resource once the vulnerability is detected, thereby reducing the risk of exploitation by an attacker and improving the security of the resource. Furthermore, by conditioning the triggering of the revocation of the leaked credential on the determination that the leaked credential is still effective in accessing the resource, the computer system ensures that network bandwidth and system processing resources are not wasted on a request to revoke a leaked credential that is not at risk of exploitation by an attacker, thereby maximizing the efficiency of this computer security solution. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
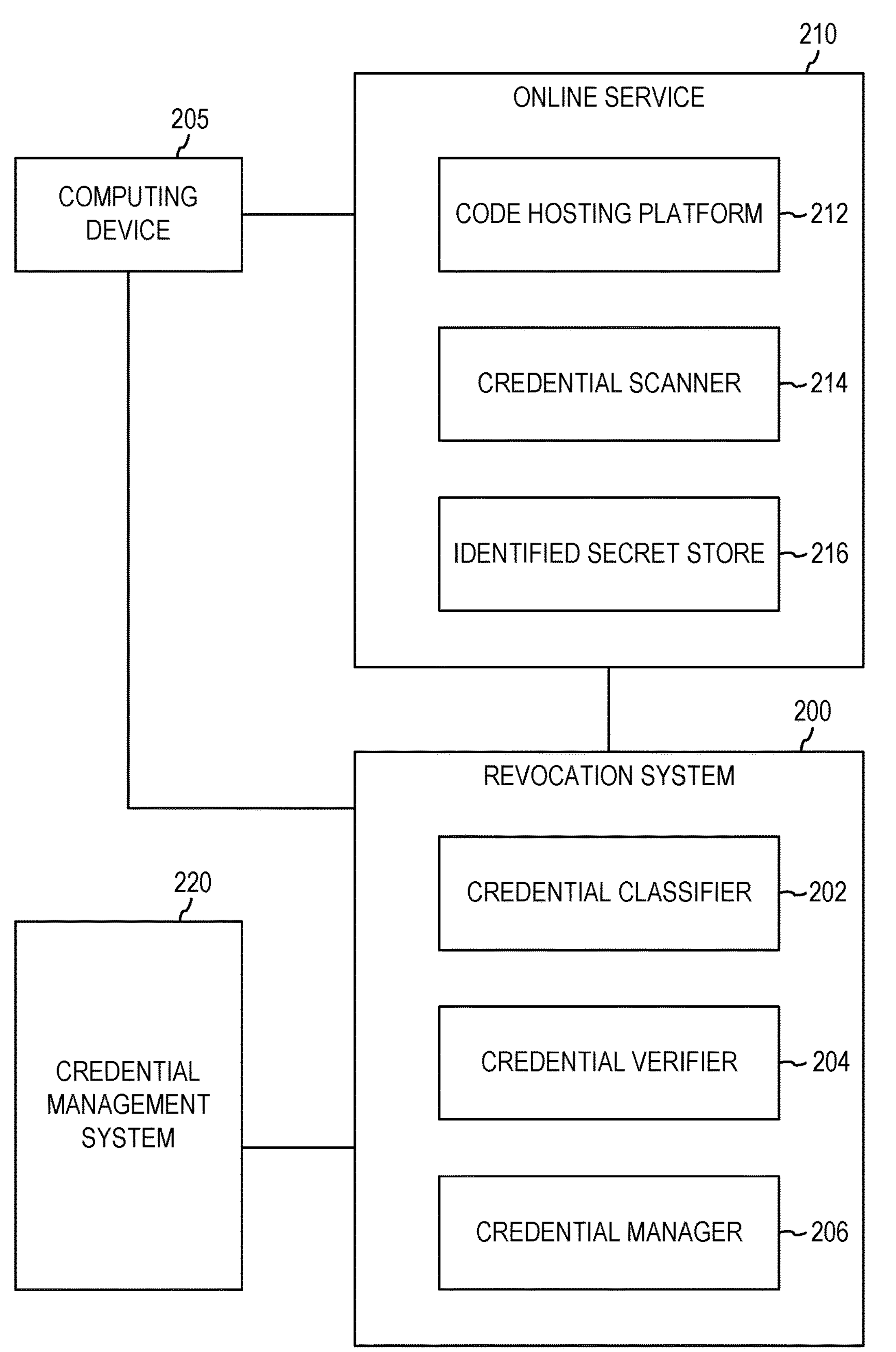
FIG. 2 is a block diagram illustrating an example revocation system.

FIG. 2 is a block diagram illustrating an example revocation system 200. The components shown in FIG. 2 may be configured to communicate with each other via one or more network connections (e.g., using the network 114 in FIG. 1). In some example embodiments, the revocation system 200 comprises any combination of one or more of a credential classifier 202, a credential verifier 204, and a credential manager 206. One or more of the components of the revocation system 200 may be implemented by the enterprise application platform 112 of FIG. 1. For example, the credential classifier 202, the credential verifier 204, and the credential manager 206 may be incorporated into the application server(s) 126. However, the revocation system 200 may be implemented in other ways as well.

The revocation system 200 may be configured to automatically revoke leaked access credentials. In some example embodiments, the credential classifier 202 may be configured to receive an indication that a credential for accessing a resource has been leaked. A resource is any physical or virtual component of limited availability within a computer system. All connected devices and internal system components are resources. Virtual system resources include files, network connections, and memory areas. In some example embodiments, the resource may comprise a database, a software application, or an application programming interface. However, other types of resources are also within the scope of the present disclosure.

The credential may have been leaked by being included in content that has been published on an online service 210 or has been stored in a shared folder of the online service 210. A shared folder is a folder that is designated, at the point of installation, for users to store files that one or more other users of the respective file-sharing network can view, download, or otherwise access. In one example, the content comprises source code uploaded by a user of a computing device 205 onto a code hosting platform 212 of the online service 210. Source code is a computer program in its original programming language before translation (e.g. by a compiler) into object code. Other types of content are also within the scope of the present disclosure. The code hosting platform 212 may comprise a file archive and web hosting facility for source code of software, documentation, web pages, and other works, accessible either publicly or privately. The code hosting platform 212 may be used for open-source software projects and other multi-developer projects to maintain revision and version history, or version control. When a software developer pushes source code into the code hosting platform 212 or a shared folder, the source code becomes accessible to other users. Depending on the nature of the code hosting platform 212, the source code can stay in a private local environment (e.g., organization or company) or can become publicly available.

The credential may comprise any user name, identification number, password, license, security key, security token, or other security code, method, technology, or device used, alone or in combination, to verify an entity's identity and authorization to access the resource. In some example embodiments, the credential may comprise a password, a digital certificate, a security key, or an access token. Other types of credentials are also within the scope of the present disclosure.

The credential scanner 214 may scan the content stored on the online service 210 to identify any credentials or other secrets included in the content. For example, the credential scanner 214 may scan the source code stored by the code hosting platform 212 to identify any credentials in the source code. The credential scanner 214 may use pattern recognition techniques involving regular expressions to identify credentials. Additionally or alternatively, the credential scanner 214 may use one or more machine learning models to identify credentials. The online service 210 may store the credentials identified by the credential scanner 214 in an identified secret store 216. The identified secret store 216 may be accessible to the revocation system 200 via a secure API. The revocation system 200 may access the identified secret store 216 in other ways as well.

The credential verifier 204 may be configured to determine that the credential is effective in accessing the resource. For example, the credential verifier 204 may transmit a verification request to a credential management system 220 to verify whether the credential is still effective in accessing the resource. The credential management system 220 may comprise any computer system that is configured to issue and manage credentials for accessing resources. In response to receiving the verification request, the credential management system 220 may perform a verification process to determine whether the credential is still effective, such as by checking the status of the credential in a database that stores credentials for resources. If the credential management system 220 determines that the credential is no longer effective, such as based on a search for the credential in the database resulting in the credential not being found in the database or an indication of the credential being expired, revoked, or otherwise ineffective), then the credential management system 220 may transmit a response to the credential verifier 204 indicating that the credential is not effective. If the credential management system 220 determines that the credential is still effective, such as based on the search of the credential in the database resulting in an indication that the credential is effective (e.g., the credential having a status of active or the like in the database), then the credential management system 220 may transmit a response to the credential verifier 204 indicating that the credential is effective.

In some example embodiments, the credential verifier 204 may be configured to identify a credential type for the credential and generate the verification request based on the credential type for the credential. Examples of credential types include, but are not limited to, an API token, a database password, and an e-mail credential. Other credential types are also within the scope of the present disclosure. The token verifier 204 may identify the credential type for the credential by inputting the credential into a machine learning classifier that is configured to classify the credential into one of one of a set of credential types. Alternatively, the credential verifier 204 may identify the credential type for the credential by applying one or more statis rules to the credential, such as by matching the format of the credential to the format of one of a set of credential types. Other ways of identifying the credential type for the credential are also within the scope of the present disclosure.

The credential verifier 204 may generate the request to verify that the credential is effective using the identified credential type. In some example embodiment, the credential verifier 204 may identify network domain information based on the identified credential type and generate the request to verify that the credential is effective based on the identifying of the network domain information. A network domain is an administrative grouping of multiple private computer networks or local hosts within the same infrastructure. Domains can be identified using a domain name. Domains which need to be accessible from the public Internet can be assigned a globally unique name within the Domain Name System (DNS). In some example embodiments, the network domain information is not directly evident based on the identified credential type. Therefore, if the credential verifier 204 determines that it cannot determine the network domain information of the credential directly from the identified credential type, the credential verifier 204 may scan the content stored on the online service 210 for the network domain information included in the content, identify the network domain information included in the content, and generate the request to verify that the credential is effective based on the identifying of the network domain information.

The network domain information may be used by the credential verifier 204 to determine the destination of the request, such as to determine to which credential management system 200 or to which credential management server within the credential management system 200 to address the request. The credential verifier 204 may be configured to transmit, to the credential management system 220, a request to verify that the credential is effective in accessing the resource. The credential verifier 204 may transmit the request to the credential management system 220 via a network connection, such as via the network 114 in FIG. 1.

The credential verifier 204 may receive, from the credential management system 220, a verification that the credential is effective in accessing the resource. The verification may comprise a message that includes “PASS” or “1” or some other text-based indication that verifies that the credential is effective in accessing the resource. Other forms or configurations of the verification are also within the scope of the present disclosure. The credential verifier 204 may, alternatively, receive a response from the credential management system 220 indicating that the credential is not effective in accessing the resource. The response may comprise a message that includes “FAIL” or “0” or some other text-based indication that indicates that the credential is not effective in accessing the resource. Other forms or configurations of the response are also within the scope of the present disclosure.

In some example embodiments, the credential manager 206 may be configured to trigger a revocation of the credential in response to the determination that the credential is effective. The revocation of the credential may cause the credential to no longer be effective in accessing the resource. The triggering of the revocation of the credential may comprise transmitting, to the credential management system 220, a request to revoke the credential. Other ways of triggering the revocation of the credential may be used as well. Additionally, subsequent to the triggering of the revocation of the credential, the credential manager 206 may cause a notification to be displayed on the computing device 205 of the user associated with the credential. For example, the notification may be transmitted to an e-mail account associated with the user. Other ways of causing the notification to be displayed on the computing device 205 of the user are also within the scope of the present disclosure.

FIG. 3 illustrates an example notification 300. The notification 300 may comprise an indication 310 that the credential has been revoked and comprise a selectable link 320 configured to, in response to its selection, navigate the computing device 205 to a page configured to enable the user to create a new credential for accessing the resource. In some example embodiments, the notification 300 may also comprise an indication 330 that a leak has been detected with respect to the credential, as well as an identification 332 of the credential. The notification 300 may further comprise an indication 340 of the reason for the detected leak, as well as an indication 342 of the content in which the leaked credential is included and an indication of the online service 344 on which the content has been published or shared. Other configurations of the notification 300 are also within the scope of the present disclosure.

Figure 4:
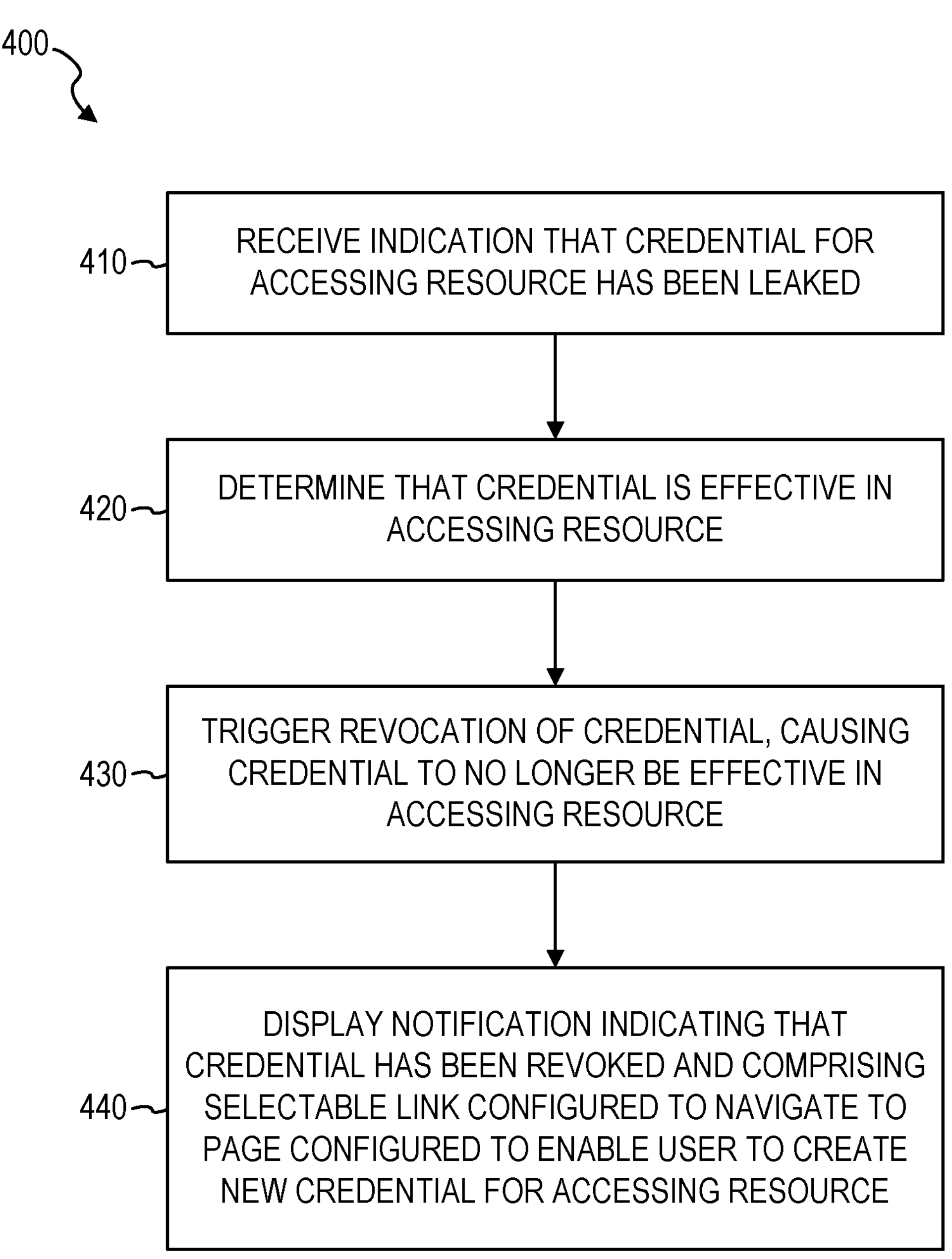
FIG. 4 is a flowchart illustrating an example method of revoking leaked access credentials.

FIG. 4 is a flowchart illustrating an example method 400 of revoking leaked access credentials. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the revocation system 200 of FIG. 2 or any combination of one or more of its components (e.g., the credential classifier 202, the credential verifier 204, the credential manager 206).

At operation 410, the revocation system 200 may receive an indication that a credential for accessing a resource has been leaked. In some example embodiments, the credential may have been leaked by being included in content that has been published on an online service 210 or has been stored in a shared folder of the online service 210. However, the credential may have been leaked in other ways as well. The credential may comprise a password, a digital certificate, a security key, or an access token. Other types of credentials are also within the scope of the present disclosure. The resource may comprise a database, a software application, or an application programming interface. However, other types of resources are also within the scope of the present disclosure. In some example embodiments, the content may comprise source code and the online service 210 may comprise a code hosting platform. Other types of content and online services 210 may be used as well.

In some example embodiments, the receiving the indication that the credential for accessing the resource has been leaked may comprise detecting that the content that has been published on the online service 210 or has been stored in the shared folder of the online service 210, scanning the content in response to the detecting that content that has been published on the online service 210 or has been stored in the shared folder of the online service 210, and identifying the credential based on the scanning of the content. However, other ways of receiving the indication that the credential for accessing the resource has been leaked are also within the scope of the present disclosure.

Next, the revocation system 200 may, at operation 420, determine that the credential is effective in accessing the resource. For example, the revocation system 200 may transmit a verification request to the credential management system 220 to verify whether the credential is still effective in accessing the resource. In response to receiving the verification request, the credential management system 220 may perform a verification process to determine whether the credential is still effective, such as by checking the status of the credential in a database that stores credentials for resources. If the credential management system 220 determines that the credential is no longer effective, such as based on a search for the credential in the database resulting in the credential not being found in the database or an indication of the credential being expired, revoked, or otherwise ineffective), then the credential management system 220 may transmit a response to the revocation system 200 indicating that the credential is not effective. If the credential management system 220 determines that the credential is still effective, such as based on the search of the credential in the database resulting in an indication that the credential is effective (e.g., the credential having a status of active or the like in the database), then the credential management system 220 may transmit a response to the revocation system 200 indicating that the credential is effective.

The revocation system 200 may then, in response to the determining that the credential is effective, trigger a revocation of the credential, at operation 430. In some example embodiments, the revocation of the credential may cause the credential to no longer be effective in accessing the resource. The triggering of the revocation of the credential may comprise transmitting, to a credential management system 220, a request to revoke the credential. Other ways of triggering the revocation of the credential may be used as well.

At operation 440, subsequent to the triggering of the revocation of the credential, the revocation system 200 may cause a notification to be displayed on a computing device 205 of a user associated with the credential. The notification may indicate that the credential has been revoked and comprise a selectable link configured to, in response to its selection, navigate the computing device 205 to a page configured to enable the user to create a new credential for accessing the resource.

It is contemplated that any of the other features described within the present disclosure can be incorporated into the method 400.

Figure 5:
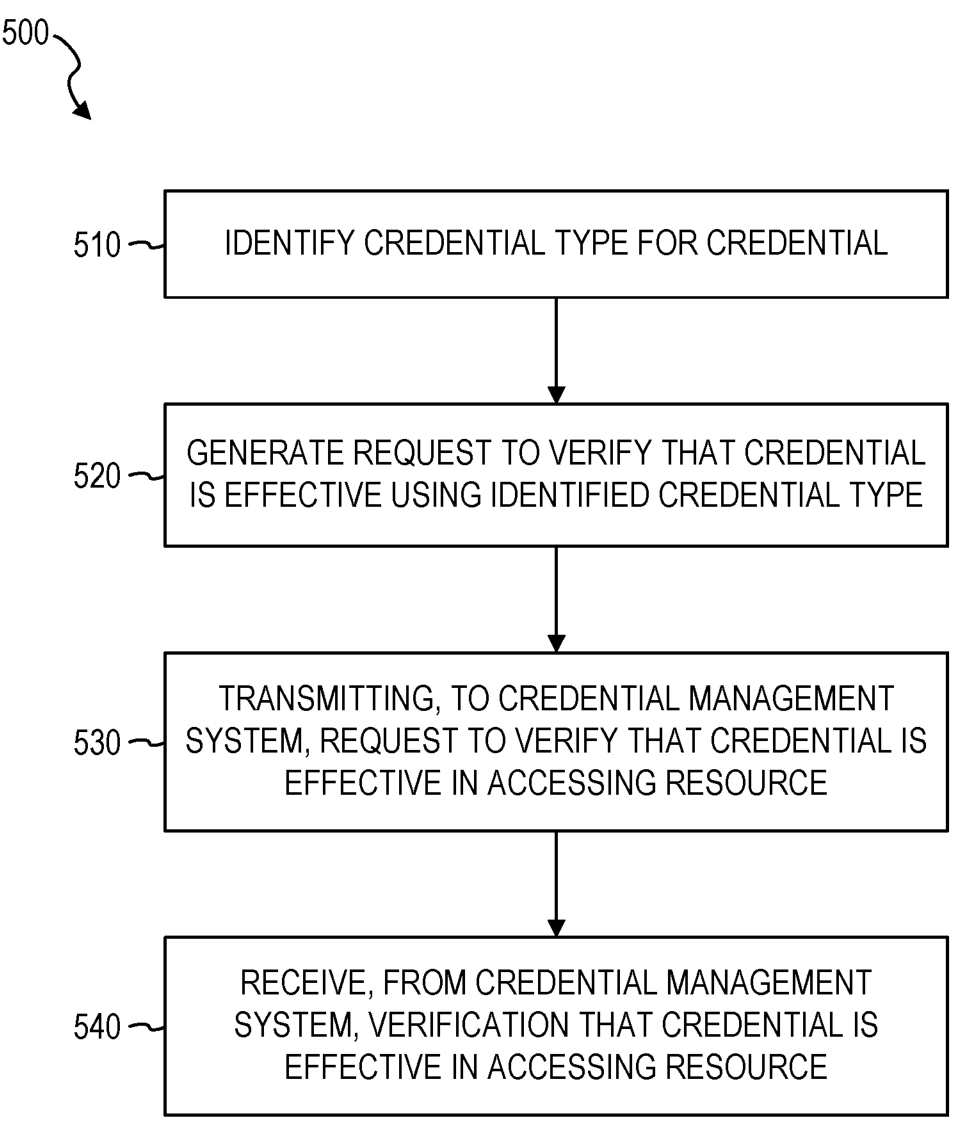
FIG. 5 is a flowchart illustrating an example method of determining that a credential is effective in accessing a resource.

FIG. 5 is a flowchart illustrating an example method 500 of determining that a credential is effective in accessing a resource. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the revocation system 200 of FIG. 2 or any combination of one or more of its components (e.g., the credential classifier 202, the credential verifier 204, the credential manager 206).

At operation 510, the revocation system 200 may identify a credential type for the credential. Examples of credential types include, but are not limited to, an application programming interface (API) token, a database password, and an e-mail credential. Other credential types are also within the scope of the present disclosure. In some example embodiments, the revocation system 200 may identify the credential type for the credential by inputting the credential into a machine learning classifier that is configured to classify the credential into one of a set of credential types. In some other example embodiments, the revocation system 200 may identify the credential type for the credential by applying one or more rules to the credential, such as by matching the format of the credential to the format of one of a set of credential types. Other ways of identifying the credential type for the credential are also within the scope of the present disclosure.

Next, the revocation system 200 may, at operation 520, generate the request to verify that the credential is effective using the identified credential type. In some example embodiment, the generating the request to verify that the credential is effective in accessing the resource may further comprise identifying network domain information based on the identified credential type and generating the request to verify that the credential is effective based on the identifying of the network domain information. Alternatively, the generating the request to verify that the credential is effective in accessing the resource further comprises scanning the content for network domain information included in the content, identifying the network domain information included in the content, and generating the request to verify that the credential is effective based on the identifying of the network domain information. The network domain information may be used to determine the destination of the request, such as to determine to which credential management system 200 or to which credential management server within the credential management system 200 to address the request.

The revocation system 200 may then transmit, to a credential management system 220, a request to verify that the credential is effective in accessing the resource, at operation 530. The revocation system 200 may transmit the request to the credential management system 220 via a network connection, such as via the network 114 in FIG. 1.

At operation 540, the revocation system 200 may receive, from the credential management system 220, a verification that the credential is effective in accessing the resource. The verification may comprise a message that includes "PASS" or "1" or some other text-based indication that verifies that the credential is effective in accessing the resource. Other forms or configurations of the verification are also within the scope of the present disclosure.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving an indication that a credential for accessing a resource has been leaked, the credential having been leaked by being included in content that has been published on an online service or has been stored in a shared folder of the online service; determining that the credential is effective in accessing the resource; and in response to the determining that the credential is effective, triggering a revocation of the credential, the revocation of the credential causing the credential to no longer be effective in accessing the resource.

Example 2 includes the computer-implemented method of example 1, wherein the credential comprises a password, a digital certificate, a security key, or an access token.

Example 3 includes the computer-implemented method of example 1 or example 2, wherein the resource comprises a database, a software application, or an application programming interface.

Example 4 includes the computer-implemented method of any one of examples 1 to 3, wherein the content comprises source code and the online service comprises a code hosting platform.

Example 5 includes the computer-implemented method of any one of examples 1 to 4, wherein the receiving the indication that the credential for accessing the resource has been leaked comprises: detecting that the content that has been published on the online service or has been stored in the shared folder of the online service; in response to the detecting that content that has been published on the online service or has been stored in the shared folder of the online service, scanning the content; and identifying the credential based on the scanning of the content.

Example 6 includes the computer-implemented method of any one of examples 1 to 5, wherein the determining that the credential is effective in accessing the resource comprises: transmitting, to a credential management system, a request to verify that the credential is effective in accessing the resource; and receiving, from the credential management system, a verification that the credential is effective in accessing the resource.

Example 7 includes the computer-implemented method of any one of examples 1 to 6, wherein the determining that the credential is effective in accessing the resource further comprises: identifying a credential type for the credential; and generating the request to verify that the credential is effective using the identified credential type.

Example 8 includes the computer-implemented method of any one of examples 1 to 7, wherein the generating the request to verify that the credential is effective in accessing the resource further comprises: identifying network domain information based on the identified credential type; and generating the request to verify that the credential is effective based on the identifying of the network domain information.

Example 9 includes the computer-implemented method of any one of examples 1 to 8, wherein the generating the request to verify that the credential is effective in accessing the resource further comprises: scanning the content for network domain information included in the content; identifying the network domain information included in the content; and generating the request to verify that the credential is effective based on the identifying of the network domain information.

Example 10 includes the computer-implemented method of any one of examples 1 to 9, wherein the triggering of the revocation of the credential comprises transmitting, to a credential management system, a request to revoke the credential.

Example 11 includes the computer-implemented method of any one of examples 1 to 10, further comprising: subsequent to the triggering of the revocation of the credential, causing a notification to be displayed on a computing device of a user associated with the credential, wherein the notification indicates that the credential has been revoked and comprises a selectable link configured to, in response to its selection, navigate the computing device to a page configured to enable the user to create a new credential for accessing the resource.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
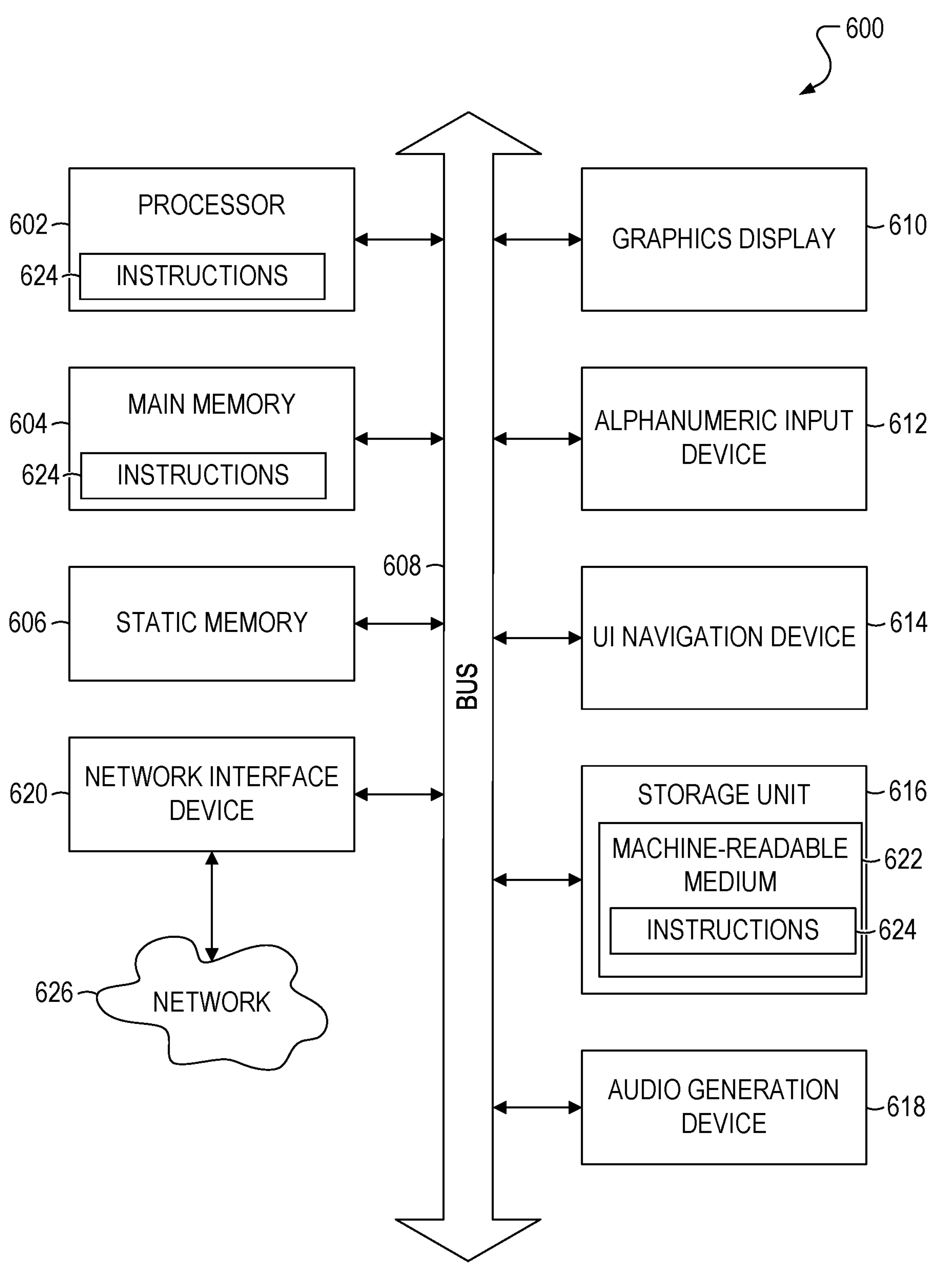
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:

scanning content uploaded to a code hosting platform of an online service to identify a credential for accessing a resource, the source code being in a format that is compilable into executable form;

receiving an indication that the credential has been leaked;

scanning the source code to identify a domain name;

determining that the credential is effective in accessing the resource, using the domain name, by searching a database that stores credentials for resources and determining whether the credential has a status of active in the database, wherein the determining that the credential is effective in accessing the resource comprises:

generating a request to verify that the credential is effective in accessing the resource, based on identification of network domain information;

transmitting, to a credential management system, the request; and receiving, from the credential management system, a verification that the credential is effective in accessing the resource; and in response to the determining that the credential is effective, triggering a revocation of the credential, the revocation of the credential causing the credential to no longer be effective in accessing the resource.

2. The computer-implemented method of claim 1, wherein the credential comprises a password, a digital certificate, a security key, or an access token.

3. The computer-implemented method of claim 1, wherein the resource comprises a database, a software application, or an application programming interface.

4. The computer-implemented method of claim 1, wherein the receiving the indication that the credential for accessing the resource has been leaked comprises:

detecting that the source code has been published on the online service or has been stored in a shared folder of the online service;

in response to the detecting that content that has been published on the online service or has been stored in the shared folder of the online service, scanning the content; and identifying the credential based on the scanning of the content.

5. The computer-implemented method of claim 1, wherein the determining that the credential is effective in accessing the resource further comprises:

identifying a credential type for the credential; and generating the request to verify that the credential is effective using the identified credential type.

6. The computer-implemented method of claim 1, wherein the triggering of the revocation of the credential comprises transmitting, to a credential management system, a request to revoke the credential.

7. The computer-implemented method of claim 1, further comprising:

subsequent to the triggering of the revocation of the credential, causing a notification to be displayed on a computing device of a user associated with the credential, wherein the notification indicates that the credential has been revoked and comprises a selectable link configured to, in response to its selection, navigate the computing device to a page configured to enable the user to create a new credential for accessing the resource.

8. The computer-implemented method of claim 1, wherein the determining that the credential is effective is performed without publicly disclosing the credential.

9. The computer-implemented method of claim 1, further comprising determining a type of the credential using a machine learning model that classifies the credential.

10. A system of comprising:

at least one hardware processor; and a non-transitory computer-readable medium storing executable instructions that, when executed, cause the at least one hardware processor to perform computer operations comprising:

scanning source code uploaded to a code hosting platform of an online service to identify a credential for accessing a resource, the source code being in a format that is compilable into executable form;

receiving an indication that the credential has been leaked;

scanning the source code to identify a domain name;

determining that the credential is effective in accessing the resource, using the domain name, by directly accessing a database that stores credentials for resources and determining whether the credential has a status of active in the database; and in response to the determining that the credential is effective, triggering a revocation of the credential, the revocation of the credential causing the credential to no longer be effective in accessing the resource.

11. The system of claim 10, wherein the credential comprises a password, a digital certificate, a security key, or an access token.

12. The system of claim 10, wherein the resource comprises a database, a software application, or an application programming interface.

13. The system of claim 10, wherein the receiving the indication that the credential for accessing the resource has been leaked comprises:

detecting that the source code has been published on the online service or has been stored in a shared folder of the online service;

in response to the detecting that content that has been published on the online service or has been stored in the shared folder of the online service, scanning the content; and identifying the credential based on the scanning of the content.

14. The system of claim 10, wherein the determining that the credential is effective in accessing the resource further comprises:

identifying a credential type for the credential; and generating the request to verify that the credential is effective using the identified credential type.

15. A non-transitory machine-readable storage medium tangibly embodying a set of instructions that, when executed by at least one hardware processor, causes the at least one processor to perform computer operations comprising:

scanning source code uploaded to a code hosting platform of an online service to identify a credential for accessing a resource, the source code being in a format that is compilable into executable form;

receiving an indication that the credential has been leaked;

scanning the source code to identify a domain name;

determining that the credential is effective in accessing the resource, using the domain name, by directly accessing a database that stores credentials for resources and determining whether the credential has a status of active in the database; and in response to the determining that the credential is effective, triggering a revocation of the credential, the revocation of the credential causing the credential to no longer be effective in accessing the resource.

* * * * *